United States Patent [19]

Neumann

[11] Patent Number: 4,464,052

[45] Date of Patent: Aug. 7, 1984

[54] DIFFERENTIAL HOLOGRAPHIC INTERFEROMETRY

[76] Inventor: Don B. Neumann, 290 Wave St., Laguna Beach, Calif. 92651

[21] Appl. No.: 260,505

[22] Filed: May 4, 1981

[51] Int. Cl.³ ............................................. G01B 9/021
[52] U.S. Cl. .................................................... 356/347
[58] Field of Search ............... 356/347, 348, 359, 360, 356/349

[56] References Cited

U.S. PATENT DOCUMENTS 3,603,684 9/1971 Wuerker ............................. 356/348

Primary Examiner—Bruce Y. Arnold
Attorney, Agent, or Firm—Krass & Young

[57] ABSTRACT

To compare the change in surface contour of a test object subjected to a stress with the changes that occur in a similar master object, subjected to the same stress, first and second holograms are formed of the surface of the master object before and after stressing employing convergent reference waves. A third double-exposure hologram is then formed wherein the first exposure is made of the test object illuminated using the first hologram reconstructed using a wave conjugate to the reference wave employed in its formation. Similarly, the second exposure is made of the test object stressed in the same manner as the master and illuminated using the second hologram reconstructed with a conjugate wave. The image of the test object as reconstructed from the third hologram will include fringes representative of the difference in strain between the model and test objects as a result of the stressing.

Alternatively, the difference between surface contours of the model and test object may be analyzed by successively forming first and second holograms of the model while it is illuminated with light of first and second different wavelengths, respectively, and then using the two holograms successively, as sources of object illuminating waves during the formation of a double exposure hologram of the test object while illuminated using the two different wavelengths, successively. The image of the second object reconstructed from the double exposure hologram will contain fringes arrayed as a function of the difference in shape of the master and test objects.

10 Claims, 4 Drawing Figures

DIFFERENTIAL HOLOGRAPHIC INTERFEROMETRY

DESCRIPTION

1. Technical Field

This invention relates to holographic methods for analyzing the difference in surface contours between two objects, and more particularly to a technique wherein holograms of the first object in two different states are used to reconstruct illumination sources for the formation of a double exposure hologram of the second object in the same two states.

2. Background Art

Holography may be employed in two ways to compare the surface contours of two objects, as for example, a "master part" and subsequently produced production parts. In non-destructive testing, holographic interferometry may be employed to determine the deformation of an object surface that results from the application of a stress, such as thermal stress or the like. The output of such an analysis is an image of the object having fringes arrayed on its surface as a function of the difference in its surface shape before and after the stress is induced. After this fringe pattern has been derived for a master object, the quality of similar production parts may be determined by comparing the fringe patterns that result from application of the same holographic interferometric test to the parts with the fringe patterns derived from the master.

Similarly, holography may be employed to produce a pattern of fringes on an object image, with the fringes arrayed along constant contours of the object. This is done by forming a double exposure hologram of the object with the object illuminated by light of differing wavelengths for the two exposures. The contours derived for a master part may then be compared with contours derived from test parts to determine differences in shape between the two parts.

In both of these methods the accurate determination of the differences between the master or standard and later comparison parts is difficult since it usually involves a point by point determination of the position for each image followed by a subtraction of the resulting values. In some cases the two images may be photographed and moire techniques used to display the differences but this approach suffers from the problems of low contrast of moire fringes, limitations in the depth of field of the camera, and relatively gross resolution values.

DISCLOSURE OF THE INVENTION

The present invention is directed toward a method which allows the direct comparison of the surface contours of test objects with those of masters or standards or the comparison of the deformation of a test object as the result of stressing with the deformation of a master object, by the generation of a hologram yielding an image of the object having superimposed fringe patterns representing only the difference of interest between the master and the part being measured or tested.

The method of the present invention broadly involves the use of the master object to form a pair of holograms. One hologram of the pair is formed while the test object is, in the case of metrology, illuminated by light of a first wavelength, or, in the case of holographic interferometry, in an unstressed condition. The second hologram of the pair is produced when the object is in its second state; i.e., illuminated by light having a second wavelength for the metrology case or in an after-stress condition in the holographic interferometric case. These two holograms are then used to reconstruct illumination sources for the formation of double exposure holograms of the object to be tested. In the case of metrology the first hologram of the pair is illuminated at the first wavelength to derive a coherent light source used to illuminate the object to form one exposure, and the second exposure is formed while the test object is illuminated at a second wavelength by waves reconstructed from the second hologram of a pair. In the holographic interferometry case the two holograms are used to reconstruct the light sources used to illuminate the object before and after stressing. In each of the cases the two wavelengths used and the stress applied are identical during the generation of the hologram pair and the formation of the double exposure hologram of the test object.

In both cases the resulting double exposure hologram of the test object contains an image of the object having superimposed fringe patterns which represent only the difference of interest between the standard or master part and the part being measured or tested. In the metrology case, if the master and test parts have identical contours, the resultant hologram will not contain any fringes. Those fringes that exist will contour the differences between the test object and the master. In the case of holographic interferometry any fringes visible on the double exposure hologram formed of the test object will represent contour differences between the test and master objects after stressing.

Effectively, each of the two holograms formed with the master object record light wavefronts that encode the contour of the master object during their formation. If the contour of the test object is identical to the master during the two formations of its double exposure hologram, no fringes will result on the master. The technique effectively subtracts the fringe patterns formed as a result of the double exposure test on the master from the fringe patterns visible as a result of the double exposure examination of the test parts so that fringes arrayed on the double exposure holograms of the test parts represent the differences between the contour or response of the master object and the test object.

This method is relatively easy to practice and interpret and provides a major improvement over the sensitivities of the prior art methods. One extremely important aspect of the present invention as it is applied to holographic interferometry is that those fringes which normally appear on the image reconstructed from the double exposure holograms and which are the result of overall motion of the object in response to applied stress are completely eliminated. These gross-motion fringes are often so extensive that they mask the fringes of interest which are those resulting from the anomalous deformation of localized areas of the test object as a result of the applied stress. In order to minimize these gross-motion fringes in the prior art practice of holographic interferometry so as to allow the anomalous fringe patterns to be detected, stress levels were often maintained extremely low. In the method of the present invention, since the gross-motion fringes common to both standard and test part are eliminated, the stress level may be greatly increased this allows the flaw signatures to be enhanced, and thus allows detection of smaller defects in the test part. In the contour case, the contour interval may be made much finer since the contour pattern will represent the difference between the master and test parts and not the gross shape of the individual parts.

Another important consideration is the ability of the human observer to detect small variations in the fringe system. Consider the case where a small subsurface flaw causes the surface of a part being tested to bulge locally by about half a fringe. If the part has undergone a gross-motion, the pattern will in general consist of a large number of finely spaced fringes, sometimes so fine that they are barely resolved. In order to detect the flaw, one must observe that the fringes deviate in that area by half a spacing. This is difficult to notice, especially since the transition at the edge of the flaw area is usually not sharp and the fringes are seldom perfectly straight.

When the comparative holography method of the present invention is used, the background fringes will be at a low spatial frequency and hence large areas will be either light or dark. The half fringe difference will now result in a bright spot in a dark fringe or a dark spot within a bright area. These intensity differences are easy for the eye to detect and the small flaw is thus quickly found. A similar argument holds for finding "a small bump on the side of a mountain" in the contouring case.

In practicing the invention, the usual techniques used for holographic interferometry are applied. A number of restraints are relaxed due to cancellation from the dual nature of the technique. For example, it is not necessary to locate the test part precisely in the position of the master part since any error is the same in comparing the first states and in comparing the second states. Similarly, the degree to which the reconstruction wave does not match the conjugate of the reference wave is not critical since this mismatch is common to both exposures of the double-exposure test hologram.

One precaution that must be taken is to assure that the changing of the holograms used to illuminate the test part does not alter the reconstruction wave. For example, if the holograms are formed on a material which is not optically flat, then either the reconstruction wave will be aberrated before it reconstructs the hologram, or the reconstructed wave will be aberrated as it travels toward the test object. Since this aberration will change with the hologram switch, it will not be cancelled and will result in reduced fringe contrast. If the hologram material is sufficiently flat, this may be overcome by making the hologram as small as possible within the limit imposed by speckle effects in the reconstruction. If this does not reduce the aberrations sufficiently the holograms may be placed in a liquid gate for formation and reconstruction. Index matching fluid in the gate will minimize the effects of poor flatness in the hologram material.

An alternative solution is to record both the holograms of the master object on the same plate using two reference waves, one for each exposure. This master hologram is then reconstructed using two waves conjugate to these reference waves, one for each step of illuminating an object to be tested. The reference waves must be separated sufficiently to negate cross-talk effects. This technique will then cancel the aberrations caused by an unflat hologram material since they will be common to both reconstructions.

BRIEF DESCRIPTION OF THE DRAWINGS

Other objectives, advantages and applications of the present invention will be made apparent by the following detailed description of several preferred embodiments of the invention. The description makes reference to the accompanying drawings in which.

BEST MODE FOR CARRYING OUT THE INVENTION

Figure 1:
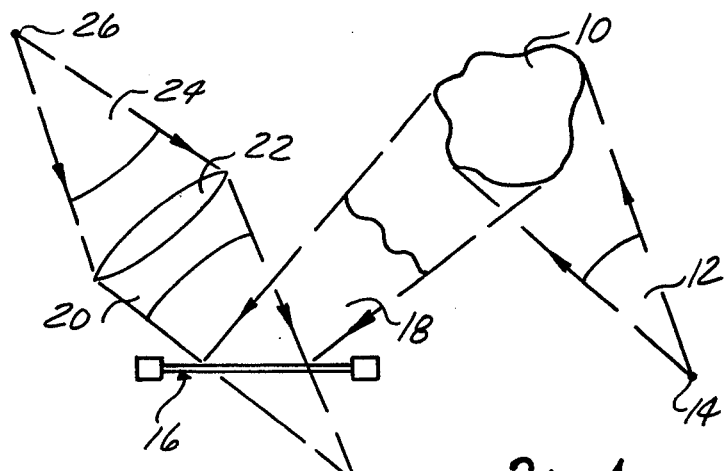
FIG. 1 is a schematic diagram illustrating the application of the present invention to either holographic interferometry or holographic contouring, employing a master object to form the pair of holograms used to later illuminate a test object.

The first step in the method of the present invention involves the formation of a pair of holograms of a master object. The first hologram is formed of the object in a first state and the second hologram is formed while the object is in a different, second state. As has been noted, the two states may represent the object in a stressed and an unstressed condition or may represent the environment of the object through which the hologram is formed; i.e., light of two different wavelengths may be used to form the two holograms. FIG. 1 schematically illustrates a process of formation of these two holograms for either of the two alternative forms of the invention.

In the process of FIG. 1 a master object 10 is illuminated with a diverging beam of coherent light 12 derived from an apparent point source 14. A photosensitive media, such as a photographic plate 16, is disposed to receive an object beam 18 of light reflected from the master 10. The photographic plate 16 is simultaneously exposed to a convergent reference beam 20 which may be obtained by illuminating a lens 22 with a divergent wave 24 originating from a point 26. The beam 20 will be coherent with the object illuminating beam 12 and both would normally be derived from a single coherent light source such as a laser (not shown), using a beam splitter (not shown) and a spatial filter (not shown). Conventional techniques to make high defraction efficiency holograms are preferably employed, such as the use of bleaching, thick emulsion, dichromated gelatin, etc.

A first hologram of the object 10 is formed by recording the interference pattern between the object beam 18 and the reference beam 20 on the photographic plate 16 and then developing the photographic plate. The first hologram is made while the object 10 is in a first state. In the case of holographic interferometry, the first state will simply be an unstressed condition. In the case of metrology, the master object 10 may be immersed in a media having a first index of refraction, such as pure water, to achieve a first light wavelength.

A second hologram of the master object 10 is then formed using a set-up identical to that illustrated in FIG. 1, but with the master 10 in a second state. In the case of holographic interferometry, this second state is achieved by applying stress to the object following the formation of the first hologram. This stress may be imposed by any of the techniques known to holographic interferometry such as heating the object or changing the atmospheric pressure on the object. In the case of metrology the master object 10 is not stressed but is preferably simply placed in a second media having a different index of refraction from the first media. For example, a water soluble salt may be added to the pure water in which the master object 10 is immersed during the formation of a first hologram to change the index of refraction of the media. Alternatively, a laser of a second, slightly different, wavelength might be used without changing the media.

The two holograms representing the master object 10 in its first and second states are then developed. It may be possible to employ recording medias which do not require development, in which case the holograms are simply formed by the exposure of the medias.

Figure 2:
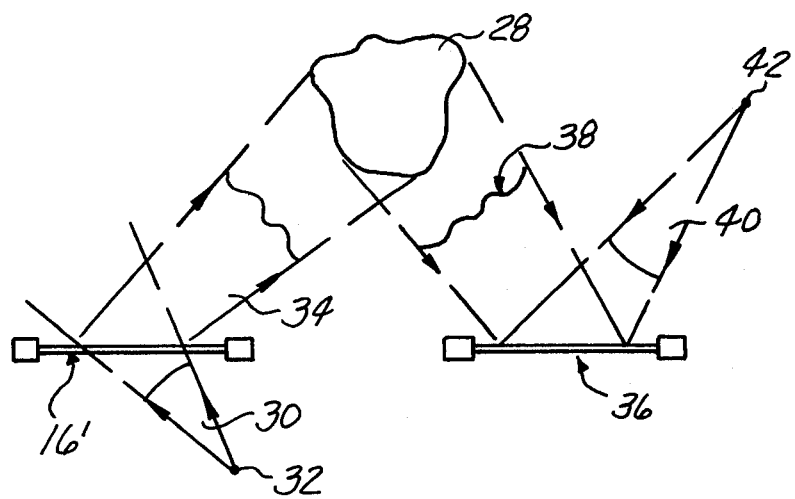
FIG. 2 is a schematic diagram illustrating the manner of forming a double exposure hologram of a test object employing successively the hologram pair in the position of 16' derived by the process of FIG. 1 as illumination sources so as to doubly-expose photographic plate 36.

The two holograms derived by apparatus arranged in the manner of FIG. 1 are then employed to form double exposure holograms of a similar test object, 28, in an arrangement schematically illustrated in FIG. 2. The test object 28 will have a surface contour similar to or identical with the master object 10 employed in the arrangement of FIG. 1. In the case of metrology it is desired to determine the differences in contour between the examined surfaces of the model 10 and the test part 28 and in the case of holographic interferometry it is desired to determine the differences in the contour changes of the examined surfaces of the model 10 and the test part 28 caused by the stressing force. In either case the test object 28 is first disposed in the same condition as was the master object 10 during the formation of the first hologram employing the apparatus of FIG. 1; that is, in either an unstressed state (for holographic interferometry) or (for contour metrology) illuminated by light of a first wavelength as by immersing it in the same media as the master object was immersed during the formation of its first hologram. The hologram 16' formed using the apparatus of FIG. 2, is then supported in exactly the same position as was the photographic media 16 in the apparatus of FIG. 1. The hologram 16' is illuminated with a diverging lightwave 30 having an apparent point source 32. The apparent point source 32 is disposed at the equivalent of the focus point of the lens 22 employed in the apparatus of FIG. 1. The waveform 30 thus reconstructs an image of the object 10 in the conjugate wave 34. This wave illuminates the object 28. A photographic plate 36 is positioned at a location approximately where the object illumination point 14 was positioned in the first step, and is exposed to the interference of a wave 38 reflected from the object 28 and a reference wave 40 originating from an apparent point source 42, such as a spatial filter illuminated by the same laser that is used to derive the reconstructing wave 30. This is the first exposure of a standard double exposure hologram and the usual considerations are again followed.

The object 28 is then placed in its second state, either by stressing the object in the same manner as the object 10 was stressed or by illuminating it with light of a second wavelength as by disposing the object 28 in a media having a second index of refraction. A second hologram 16' which was derived during the second step of a method employing the apparatus of FIG. 1 is then positioned in the apparatus and a second exposure of the photographic plate 36 is made employing the second hologram as a source of the object beam. The photographic plate 36 is then processed to form a double exposure hologram.

The positioning of the elements between the steps of FIG. 1 and the steps of FIG. 2 need only be approximate. Slight variations should be cancelled by the symmetry of the two exposures. Of course, there must be no change in position of the illumination sources between the first and second exposures of the hologram.

Also, the position of the two holograms must be exactly the same as their relative positions during the formation of the holograms. This is easily accomplished if the same plate-holder is used in both steps and can be accomplished without too much difficulty between two plate holders of similar design.

Figure 3:
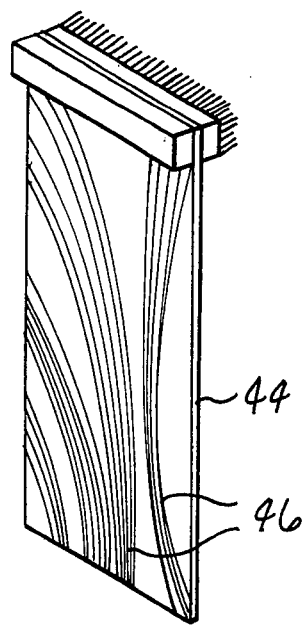
FIG. 3 is an illustration of the reconstruction of a test object from a double exposure hologram derived from the process of FIG. 2 and showing fringe patterns superimposed on the image of the test object and which represent its contour differences with respect to the master object.

FIG. 3 illustrates the image of a test object 44, taking the form of a section of a cantilevered beam in longitudinal bending, as reconstructed from a double exposure hologram made using the technique of the present invention. The image contains several fringes 46 which clearly reveal in outline the contour differences between the test object and the model used to form the two holograms that were employed to reconstruct the illumination sources during the formation of the hologram from which the image of FIG. 3 was reconstructed.

Figure 4:
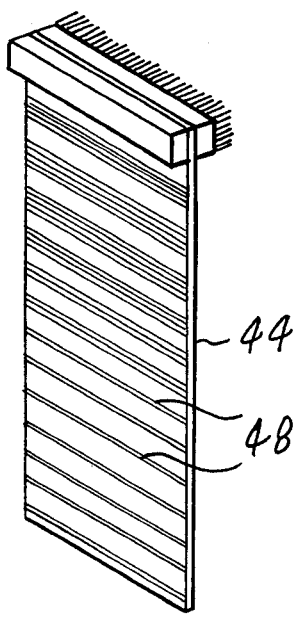
FIG. 4 is an image of the test object illustrating fringe families which might be derived by the conventional practice of holographic interferometry, including gross deformation patterns which mask the anomalous fringes which are of interest in the object.

By contrast, FIG. 4 illustrates an image of the same test object 44 analyzed by double exposure holography. The image contains a large number of fringes 48 which represent the overall deformation of the object during stressing, as opposed to differences in contour between it and the master. These concentrated fringes mask the fringes of interest, those which indicate differential strain on the object as a result of the stressing.

I claim:
1. The method of analyzing the difference in surface contours of two objects having similar surface contours, comprising:
   forming a first hologram of a first of the objects in a first state;
   forming a second hologram of the first of the objects in a second state;
   illuminating the second object, while it is in said first state, with light wavefronts reconstructed from said first hologram and recording the interference pattern between the resulting object beam and a reference beam in a first exposure of a holographic recording media;
   illuminating the second object, while it is in said second state, with light wavefronts reconstructed from said second hologram and recording the resulting interference pattern between the object beam and a reference beam in a second exposure of said holographic recording media; and viewing an image of the second object as reconstructed from the resulting doubly exposed holographic media and analyzing fringes visible thereon which are representative of the differences in surface contours of the first and second object.

2. The method of claim 1 in which the difference between the first and second states of the first and second objects is achieved by stressing the objects in a substantially identical manner between the first and second states.

3. The method of claim 2 wherein the stress is imposed on the objects between the first and second states by modifying the temperature of the objects.

4. The method of claim 2 wherein the stress in imposed on the objects between the first and second states by applying a force to the objects.

5. The method of claim 2 wherein the stress imposed on the objects between the first and second states by changing the ambient pressure of the fluid surrounding the objects.

6. The method of claim 1 in which converging reference beams are employed to create said first and second holograms and the reconstruction waves used to illuminate the first and second holograms during recordation of interference patterns resulting from the second object are divergent waves conjugate to said reference waves.

7. The method of claim 1 in which divergent reference beams are employed to create said first and second holograms and the reconstruction waves used to illuminate the first and second holograms during recordation of interference patterns resulting from the second object are convergent waves conjugate to said reference waves.

8. The method of claim 1 in which said holographic media is processed following recording upon it of intereference patterns resulting from illumination of the second object in its first and second states to form a third hologram and an image of the second object is reconstructed from the third hologram.

9. The method of claim 1 wherein the first hologram of the said first object is formed using a different reference source direction from that used to form the second hologram of the first object; and these holograms are reconstructed using corresponding directions when illuminating the second object.

10. The method of analyzing a difference in surface contours of a first object and a second object having similar surface contours, comprising;
- forming a first hologram of the first object using a light of a first wavelength;
- forming a second hologram of the first object using light of a second wavelength;
- illuminating the second object with the light wavefronts reconstructed from said first hologram and recording the interference pattern between the resulting object beam and a reference beam in a first exposure of a holographic media;
- illuminating the second object with light wavefronts reconstructed from said second hologram and recording the resulting interference pattern between the object and reference beam in a second exposure of said holographic recording media;
- and viewing an image of the second object as reconstructed from the resulting doubly-exposed holographic media and analyzing fringes visible thereon which are representative of the differences in surface contours of the first and second objects.

* * * * *